(12) United States Patent
Huang

(10) Patent No.: US 8,567,014 B1
(45) Date of Patent: Oct. 29, 2013

(54) FOLDABLE HANDLE

(75) Inventor: Chi-Haw Huang, Homei Changhwa (TW)

(73) Assignee: San Kong Enterprise Co., Ltd., Changhua County (TW)

( * ) Notice: Subject to any disclaimer, the term of this patent is extended or adjusted under 35 U.S.C. 154(b) by 0 days.

(21) Appl. No.: 13/542,745

(22) Filed: Jul. 6, 2012

(51) Int. Cl.
*B25G 1/04* (2006.01)
*A45C 13/26* (2006.01)

(52) U.S. Cl.
USPC .............................................. 16/429; 16/405

(58) Field of Classification Search
USPC ........... 16/429, 444, 445, 438, 418, 273, 374, 16/375, 426, DIG. 40, DIG. 41, 405
See application file for complete search history.

(56) References Cited

U.S. PATENT DOCUMENTS

| | | | | |
|---|---|---|---|---|
| 2,624,431 A * | 1/1953 | Caro | ............................... | 16/408 |
| 2,652,908 A * | 9/1953 | Fuller | ............................ | 16/408 |
| 2,678,707 A * | 5/1954 | Finkelstein | ..................... | 16/408 |
| RE24,067 E * | 10/1955 | Dorgin | ......................... | 16/114.1 |
| 3,082,473 A * | 3/1963 | West | ............................... | 16/445 |
| 3,562,849 A * | 2/1971 | Brayshaw | ....................... | 16/445 |
| 3,988,802 A * | 11/1976 | Bruni et al. | ..................... | 16/429 |
| 4,115,669 A * | 9/1978 | Cali | .............................. | 200/331 |
| D283,977 S * | 5/1986 | Kunzler | ........................ | D8/301 |
| 5,005,255 A * | 4/1991 | Pare et al. | ........................ | 16/429 |
| 5,168,601 A * | 12/1992 | Liu | ................................ | 16/445 |
| 5,331,695 A * | 7/1994 | Bales | .............................. | 5/136 |
| 5,706,556 A * | 1/1998 | Kluting | ............................ | 16/273 |
| 5,887,927 A * | 3/1999 | Kurek et al. | ................... | 294/158 |
| 6,097,592 A * | 8/2000 | Seo et al. | ................. | 361/679.55 |
| 6,152,317 A * | 11/2000 | Newby, Sr. | .................... | 220/4.22 |
| 6,173,475 B1 * | 1/2001 | Senn et al. | ...................... | 16/273 |
| 6,581,245 B2 * | 6/2003 | Jen | .................................. | 16/408 |
| 6,618,902 B2 * | 9/2003 | Wu | ................................. | 16/298 |
| 6,643,897 B2 * | 11/2003 | Chang | ............................ | 16/248 |
| 6,862,777 B2 * | 3/2005 | LaPointe | ......................... | 16/221 |
| 7,249,395 B2 * | 7/2007 | Brammer et al. | ............... | 16/412 |
| 7,342,778 B2 * | 3/2008 | Fan et al. | ................. | 361/679.55 |
| 7,576,981 B2 * | 8/2009 | Kuo | ........................ | 361/679.59 |
| 7,612,998 B2 * | 11/2009 | Fan et al. | ................. | 361/679.59 |
| 7,948,753 B2 * | 5/2011 | Wang | ....................... | 361/679.59 |
| 8,146,208 B2 * | 4/2012 | Kajio et al. | ..................... | 16/444 |
| 8,186,018 B2 * | 5/2012 | Martin | ............................ | 16/426 |

(Continued)

FOREIGN PATENT DOCUMENTS

EP 149492 A2 * 7/1985 ................ E05D 7/10

OTHER PUBLICATIONS

Machine Translation—Description of Invention EP 0149492 A2.*

*Primary Examiner* — Victor Batson
*Assistant Examiner* — Jason W San
(74) *Attorney, Agent, or Firm* — Alan Kamrath; Kamrath IP Lawfirm, P.A.

(57) ABSTRACT

A foldable handle includes a handgrip having two opposite ends each provided with a pivot portion, two mounting seats each pivotally connected with the respective pivot portion of the handgrip, two pivot members each mounted between the respective pivot portion of the handgrip and the respective mounting seat, and two bushings each mounted between the respective pivot portion of the handgrip and the respective mounting seat. Thus, each of the pivot members and each of the bushings are located between the respective pivot portion of the handgrip and the respective mounting seat so that the respective pivot portion of the handgrip is pivoted relative to each of the mounting seats smoothly.

5 Claims, 4 Drawing Sheets

(56) References Cited

U.S. PATENT DOCUMENTS

| | | | |
|---|---|---|---|
| 8,245,357 B2* | 8/2012 | Kajio et al. | 16/444 |
| 2006/0034045 A1* | 2/2006 | Wang | 361/683 |
| 2010/0223759 A1* | 9/2010 | Baik et al. | 16/408 |
| 2011/0225771 A1* | 9/2011 | Bartnick | 16/429 |
| 2011/0289727 A1* | 12/2011 | Le | 16/273 |
| 2013/0047380 A1* | 2/2013 | Huang et al. | 16/429 |

* cited by examiner

FOLDABLE HANDLE

BACKGROUND OF THE INVENTION

1. Field of the Invention

The present invention relates to a handle and, more particularly, to a foldable handle for a wardrobe, cupboard, door, drawer, cabinet, refrigerator and the like.

2. Description of the Related Art

A conventional foldable handle in accordance with the prior art shown in FIG. 5 comprises a handgrip 5 having two opposite ends each provided with a pivot portion 52, two mounting seats 54 each pivotally connected with the respective pivot portion 52 of the handgrip 5, and two pins 58 each extended through a respective one of the mounting seats 54 and the respective pivot portion 52 of the handgrip 5. The handgrip 5 has a substantially inverted U-shaped profile. The pivot portion 52 of the handgrip 5 has an interior provided with a first through hole 53. Each of the mounting seats 54 has an upper end provided with a receiving recess 55 and a lower end provided with a threaded rod 57. The receiving recess 55 of each of the mounting seats 54 receives the respective pivot portion 52 of the handgrip 5. The receiving recess 55 of each of the mounting seats 54 has two opposite sidewalls each provided with a second through hole 56 which is concentric and aligned with the first through hole 53 of the handgrip 5. Each of the pins 58 is extended through the second through hole 56 of each of the mounting seats 54 and the first through hole 53 of the handgrip 5. In assembly, the threaded rod 57 of each of the mounting seats 54 is locked onto an object so as to attach the foldable handle to the object. In operation, the respective pivot portion 52 of the handgrip 5 is pivoted relative to each of the mounting seats 54 so that the handgrip 5 is pivoted relative to the mounting seats 54 until the grip portion 1 is disposed at a folded position. Thus, when the grip portion 1 is hit by a person unintentionally, the grip portion 1 is moved and rotated relative to the mounting seats 54 freely to reach a folded state so as to prevent the person from being hurt due to hit with the grip portion 1. However, the respective pivot portion 52 of the handgrip 5 directly contacts with each of the mounting seats 54 so that noise or dust easily produces due to friction between the respective pivot portion 52 of the handgrip 5 and each of the mounting seats 54 during a long-term rotation therebetween, thereby decreasing the lifetime of the foldable handle.

BRIEF SUMMARY OF THE INVENTION

In accordance with the present invention, there is provided a foldable handle, comprising a handgrip having two opposite ends each provided with a pivot portion, two mounting seats each pivotally connected with the respective pivot portion of the handgrip, two pivot members each mounted between the respective pivot portion of the handgrip and a respective one of the mounting seats, two bushings each mounted between the respective pivot portion of the handgrip and a respective one of the mounting seats, and two fastening members each extended through a respective one of the mounting seats, the respective pivot portion of the handgrip, a respective one of the pivot members and a respective one of the bushings. The pivot portion of the handgrip has a bottom provided with an abutting face. The abutting face of the pivot portion of the handgrip has an arcuate shape. The pivot portion of the handgrip has an interior provided with a pivot hole for mounting each of the pivot members. The pivot hole of the handgrip has two opposite sides each provided with a limit section for limiting the respective pivot member and the respective bushing. Each of the pivot members is extended through the pivot hole of the respective pivot portion of the handgrip. Each of the pivot members has an interior provided with a through hole to allow passage of the respective fastening member. Each of the pivot members has a first end provided with a shaft and a second end provided with a flange. Each of the mounting seats has an upper end provided with a receiving recess and a lower end provided with a connecting portion. The receiving recess of each of the mounting seats has two opposite sidewalls. Each of the two opposite sidewalls of the receiving recess of each of the mounting seats is provided with a locking hole which is concentric and aligned with the pivot hole of the handgrip. The two opposite sidewalls of the receiving recess of each of the mounting seats abut the respective pivot member and the respective bushing respectively.

The shaft of each of the pivot members is inserted through the pivot hole of the respective pivot portion of the handgrip. The flange of each of the pivot members has a side provided with an abutment. The abutment of the flange of each of the pivot members abuts the respective limit section of the respective pivot portion of the handgrip. The flange of each of the pivot members is partially received in the respective limit section of the respective pivot portion of the handgrip and is partially protruded outward from the respective pivot portion of the handgrip. The flange of each of the pivot members has a diameter greater than that of the shaft and equal to that of the respective limit section of the respective pivot portion of the handgrip.

Each of the bushings is mounted on the shaft of the respective pivot member and abuts the respective limit section of the respective pivot portion of the handgrip. Each of the bushings is partially received in the respective limit section of the respective pivot portion of the handgrip and is partially protruded outward from the respective pivot portion of the handgrip. Each of the bushings has a diameter equal to that of the respective limit section of the respective pivot portion of the handgrip.

The connecting portion of each of the mounting seats is preferably a screw bore or a threaded rod.

Preferably, each of the fastening members is a pin.

The primary objective of the present invention is to provide a foldable handle having little friction during rotation.

According to the primary advantage of the present invention, each of the pivot members and each of the bushings are located between the respective pivot portion of the handgrip and the respective mounting seat so that the respective pivot portion of the handgrip is pivoted relative to each of the mounting seats smoothly without producing noise and rust due to friction between the respective pivot portion of the handgrip and each of the mounting seats during a long-term rotation therebetween, thereby enhancing the lifetime of the foldable handle.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
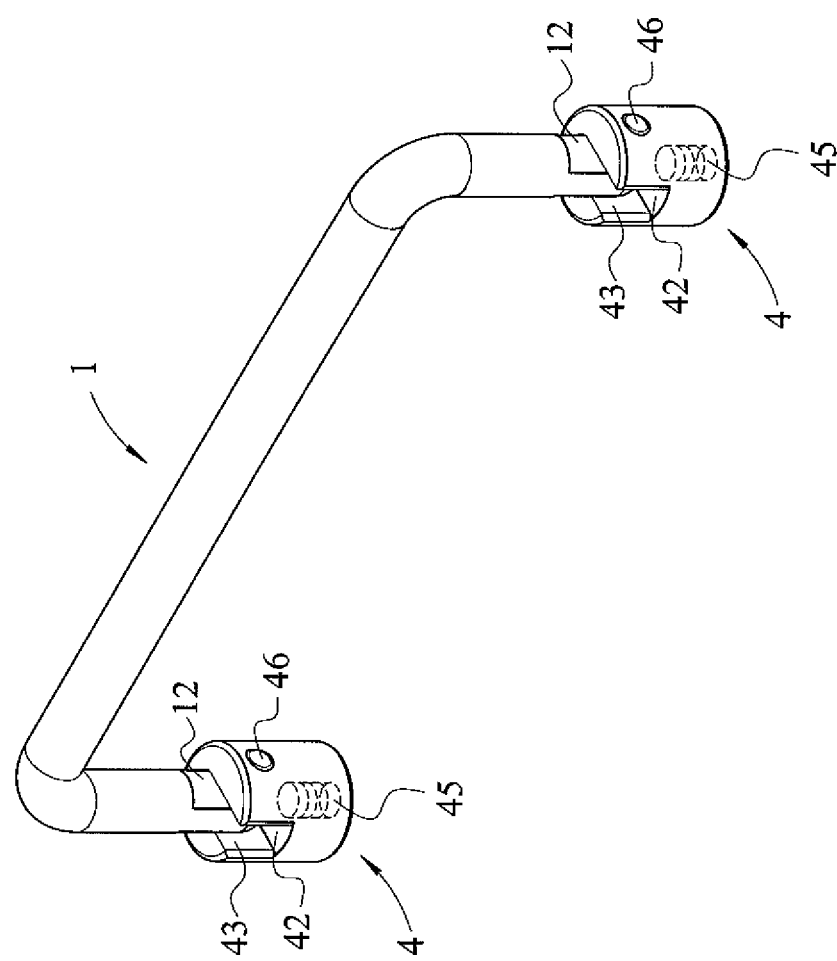
FIG. 1 is a perspective view of a foldable handle in accordance with the preferred embodiment of the present invention.
Figure 2:
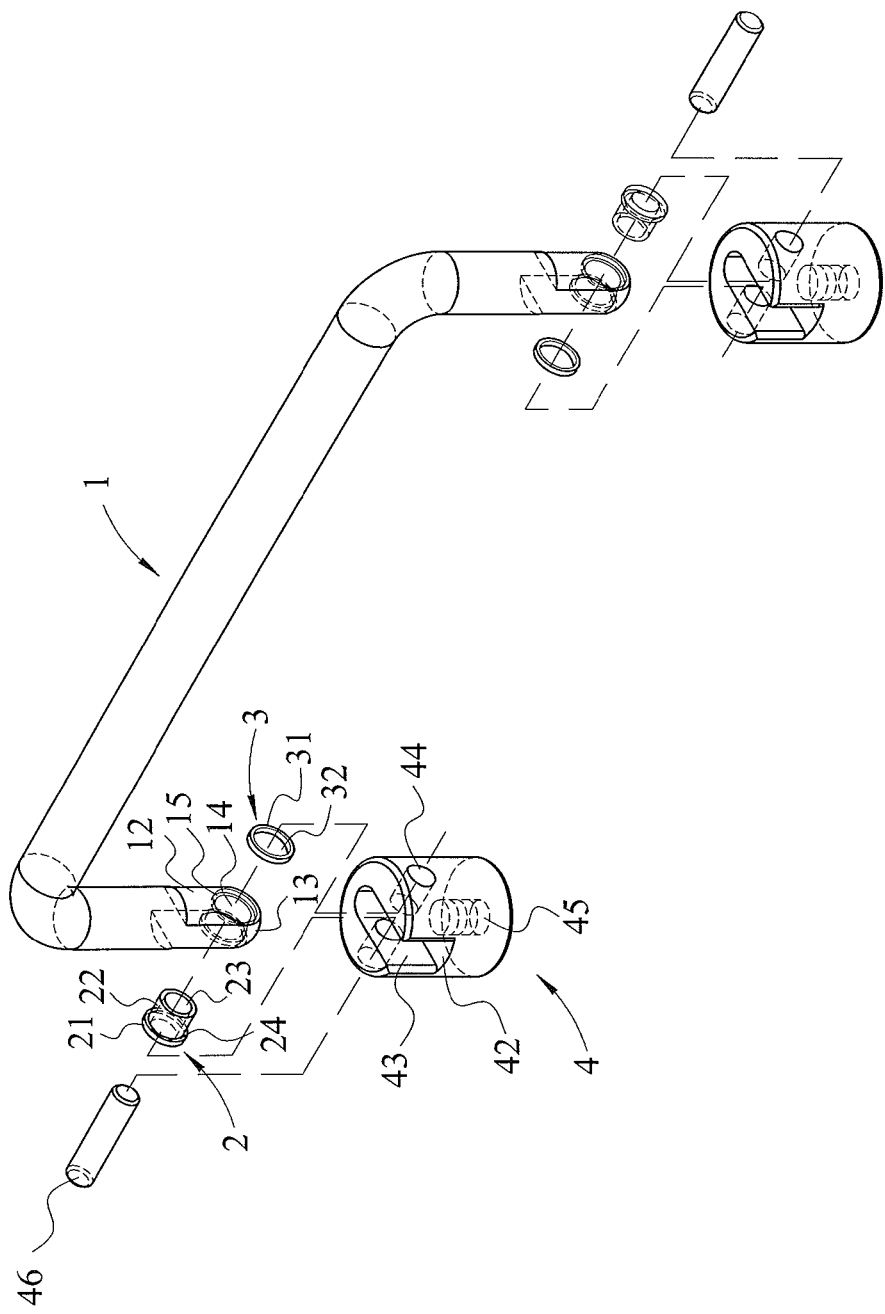
FIG. 2 is an exploded perspective view of the foldable handle as shown in FIG. 1.
Figures 3, 4:
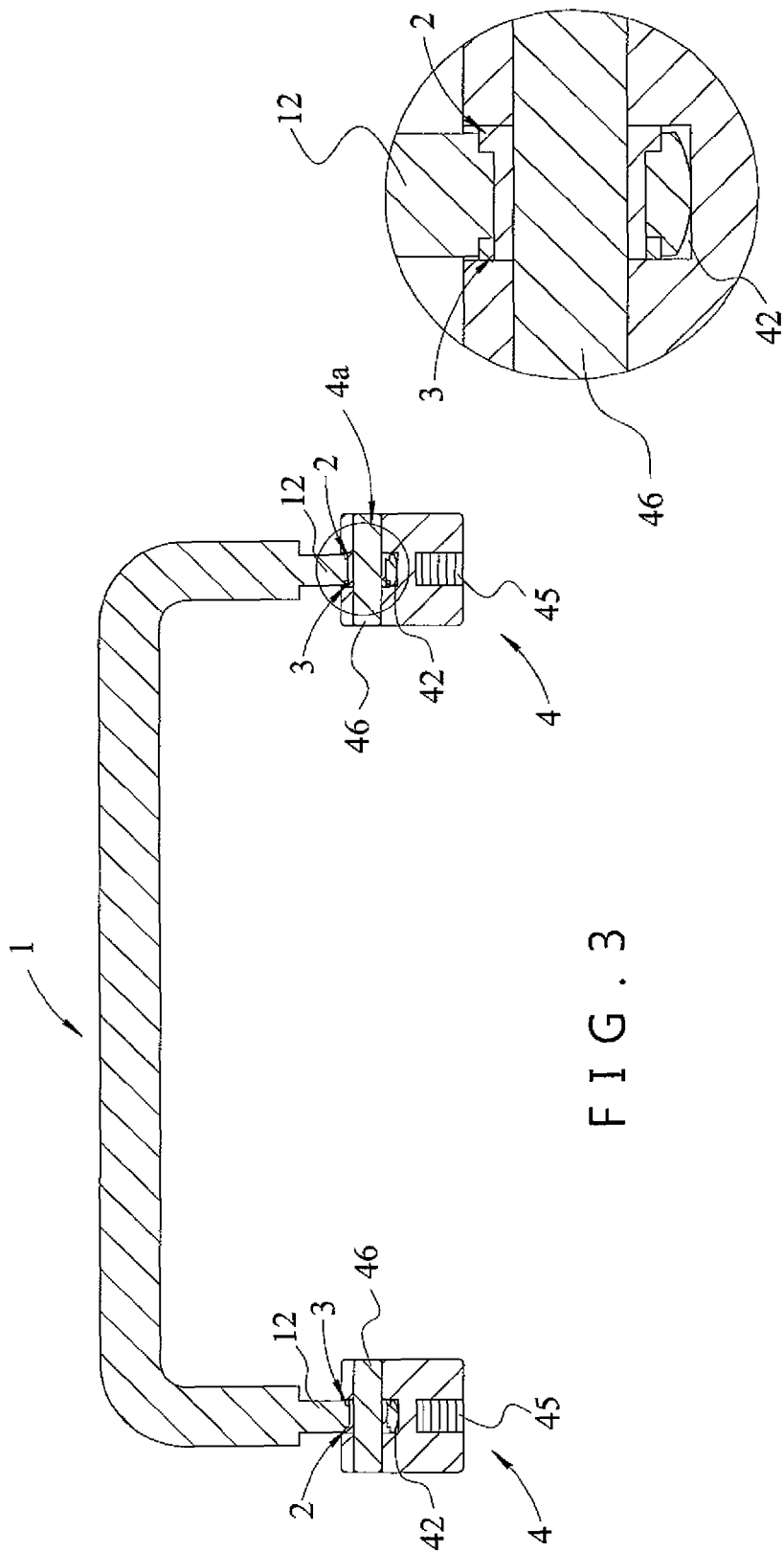
FIG. 3 is a front cross-sectional view of the foldable handle as shown in FIG. 1.
FIG. 4 is an enlarged view of the foldable handle of inset 4a as shown in FIG. 3.
Figure 5:
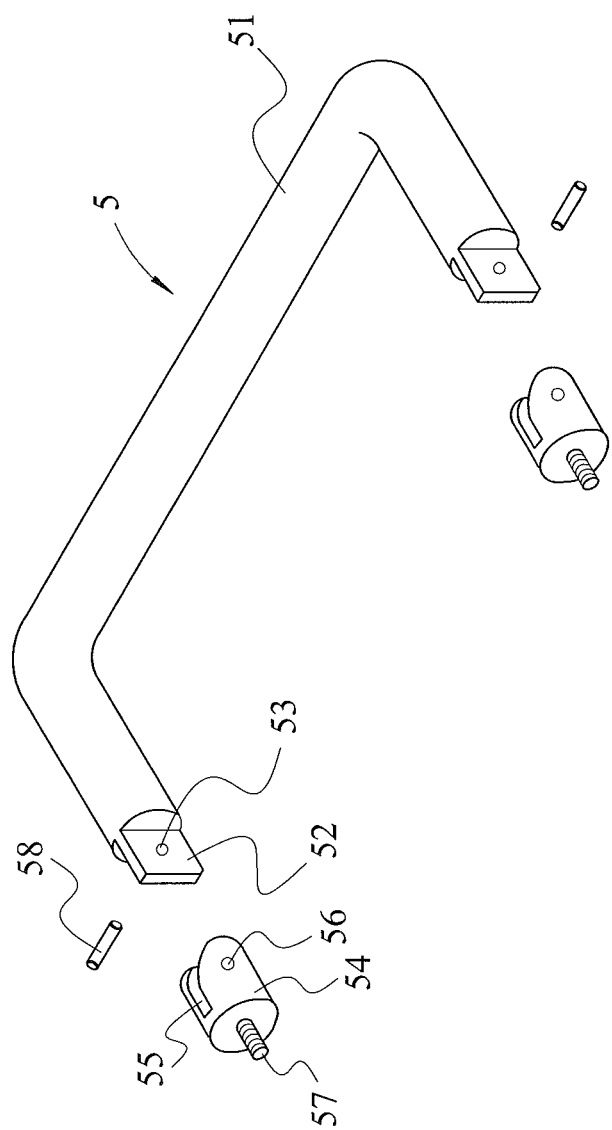
FIG. 5 is an exploded perspective view of a conventional foldable handle in accordance with the prior art.

Referring to FIGS. 1-4, a foldable handle in accordance with the preferred embodiment of the present invention comprises a handgrip 1 having two opposite ends each provided with a pivot portion 12, two mounting seats 4 each pivotally connected with the respective pivot portion 12 of the handgrip 1, two pivot members 2 each mounted between the respective pivot portion 12 of the handgrip 1 and a respective one of the mounting seats 4, two bushings 3 each mounted between the respective pivot portion 12 of the handgrip 1 and a respective one of the mounting seats 4, and two fastening members 46 each extended through a respective one of the mounting seats 4, the respective pivot portion 12 of the handgrip 1, a respective one of the pivot members 2 and a respective one of the bushings 3.

The handgrip 1 has a substantially inverted U-shaped profile. The pivot portion 12 of the handgrip 1 has a bottom provided with an abutting face 13. The abutting face 13 of the pivot portion 12 of the handgrip 1 has an arcuate shape. The pivot portion 12 of the handgrip 1 has an interior provided with a pivot hole 14 for mounting each of the pivot members 2. The pivot hole 14 of the handgrip 1 has two opposite sides each provided with a limit section 15 for limiting the respective pivot member 2 and the respective bushing 3. The limit section 15 of the handgrip 1 has a dimension greater than that of the pivot hole 14. Preferably, the limit section 15 of the handgrip 1 is a depression to receive the respective pivot member 2 and the respective bushing 3.

Each of the pivot members 2 is extended through the pivot hole 14 of the respective pivot portion 12 of the handgrip 1. Each of the pivot members 2 has a tubular shape and has an interior provided with a through hole 23 to allow passage of the respective fastening member 46. Each of the pivot members 2 has a first end provided with a shaft 22 and a second end provided with a flange 21. The shaft 22 of each of the pivot members 2 is inserted through the pivot hole 14 of the respective pivot portion 12 of the handgrip 1. The flange 21 of each of the pivot members 2 is partially received in the respective limit section 15 of the respective pivot portion 12 of the handgrip 1 and is partially protruded outward from the respective pivot portion 12 of the handgrip 1. The flange 21 of each of the pivot members 2 has a diameter greater than that of the shaft 22 and equal to that of the respective limit section 15 of the respective pivot portion 12 of the handgrip 1. The flange 21 of each of the pivot members 2 has a side provided with an abutment 24. The abutment 24 of the flange 21 of each of the pivot members 2 abuts the respective limit section 15 of the respective pivot portion 12 of the handgrip 1.

Each of the bushings 3 is mounted on the shaft 22 of the respective pivot member 2 and abuts the respective limit section 15 of the respective pivot portion 12 of the handgrip 1. Each of the bushings 3 is partially received in the respective limit section 15 of the respective pivot portion 12 of the handgrip 1 and is partially protruded outward from the respective pivot portion 12 of the handgrip 1. Each of the bushings 3 is an O-ring and has a diameter equal to that of the respective limit section 15 of the respective pivot portion 12 of the handgrip 1. Each of the bushings 3 has two opposite ends faces 31. One of the two opposite ends faces 31 of each of the bushings 3 abuts the respective limit section 15 of the respective pivot portion 12 of the handgrip 1. Each of the bushings 3 has an interior provided with a mounting hole 32 mounted on the shaft 22 of the respective pivot member 2.

Each of the mounting seats 4 has a column shape and has an upper end provided with a receiving recess 42 and a lower end provided with a threaded connecting portion 45. The receiving recess 42 of each of the mounting seats 4 receives the respective pivot portion 12 of the handgrip 1, the respective pivot member 2 and the respective bushing 3, and has a bottom wall abutting the abutting face 13 of the respective pivot portion 12 of the handgrip 1. The receiving recess 42 of each of the mounting seats 4 has two opposite sidewalls 43. The receiving recess 42 of each of the mounting seats 4 has a front side provided with an opening to allow passage of the respective pivot portion 12 of the handgrip 1. Each of the two opposite sidewalls 43 of the receiving recess 42 of each of the mounting seats 4 is provided with a locking hole 44 which is concentric and aligned with the pivot hole 14 of the handgrip 1. The two opposite sidewalls 43 of the receiving recess 42 of each of the mounting seats 4 abut the respective pivot member 2 and the respective bushing 3 respectively. The threaded connecting portion 45 of each of the mounting seats 4 is preferably a screw bore.

Each of the fastening members 46 is extended through the locking hole 44 of each of the two opposite sidewalls 43 of the receiving recess 42 of each of the mounting seats 4 and the through hole 23 of the respective pivot member 2. Preferably, each of the fastening members 46 is a pin.

In assembly, the threaded connecting portion 45 of each of the mounting seats 4 is locked onto an object by a locking member, such as a locking bolt or screw, so as to attach the foldable handle to the object. In operation, the respective pivot portion 12 of the handgrip 1 is pivoted relative to each of the mounting seats 4 so that the handgrip 1 is pivoted relative to the mounting seats 4 until the grip portion 1 is disposed at a folded position. Thus, when the grip portion 1 is hit by a person unintentionally, the grip portion 1 is moved and rotated relative to the mounting seats 4 freely to reach a folded state so as to prevent the person from being hurt due to hit with the grip portion 1.

Accordingly, each of the pivot members 2 and each of the bushings 3 are located between the respective pivot portion 12 of the handgrip 1 and the respective mounting seat 4 so that the respective pivot portion 12 of the handgrip 1 is pivoted relative to each of the mounting seats 4 smoothly without producing noise and rust due to friction between the respective pivot portion 12 of the handgrip 1 and each of the mounting seats 4 during a long-term rotation therebetween, thereby enhancing the lifetime of the foldable handle.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A foldable handle, comprising:
   a handgrip having two opposite ends each provided with a pivot portion;
   two mounting seats each pivotally connected with the respective pivot portion of the handgrip;
   two pivot members each mounted in the respective pivot portion of the handgrip;
   two bushings each mounted in the respective pivot portion of the handgrip; and
   two fastening members each extended through the respective mounting seat and the respective pivot member;

wherein the pivot portion of each of the two opposite ends of the handgrip has a bottom provided with an abutting face;

the abutting face of the pivot portion of each of the two opposite ends of the handgrip has an arcuate shape;

the pivot portion of each of the two opposite ends of the handgrip has an interior provided with a pivot hole for mounting each of the pivot members;

the pivot hole of the pivot portion of each of the two opposite ends of the handgrip has two opposite sides each provided with a limit section for limiting the respective pivot member and the respective bushing;

each of the pivot members is extended through the pivot hole of the respective pivot portion of the handgrip;

each of the pivot members has an interior provided with a through hole to allow passage of the respective fastening member;

each of the pivot members has a first end provided with a shaft and a second end provided with a flange;

each of the pivot members is inserted through the respective bushing;

each of the bushings is mounted on the respective pivot member;

each of the pivot members separates the respective fastening member and the respective bushing;

each of the mounting seats has an upper end provided with a receiving recess and a lower end provided with a connecting portion;

the receiving recess of each of the mounting seats has two opposite interior sidewalls;

each of the two opposite interior sidewalls of the receiving recess of each of the mounting seats is provided with a locking hole which is concentric and aligned with the respective pivot hole of the handgrip; and the two opposite interior sidewalls of the receiving recess of each of the mounting seats abut the respective pivot member and the respective bushing.

2. The foldable handle of claim 1, wherein the shaft of each of the pivot members is inserted through the pivot hole of the respective pivot portion of the handgrip, the flange of each of the pivot members has a side provided with an abutment, the flange of each of the pivot members is partially received in the respective limit section of the respective pivot portion of the handgrip and is partially protruded outward from the respective pivot portion of the handgrip, and the flange of each of the pivot members has a diameter greater than that of the shaft and equal to that of the respective limit section of the respective pivot portion of the handgrip.

3. The foldable handle of claim 1, wherein each of the bushings is mounted on the shaft of the respective pivot member, each of the bushings is partially received in the respective limit section of the respective pivot portion of the handgrip and is partially protruded outward from the respective pivot portion of the handgrip, and each of the bushings has a diameter equal to that of the respective limit section of the respective pivot portion of the handgrip.

4. The foldable handle of claim 1, wherein the connecting portion of each of the mounting seats is preferably a screw bore.

5. The foldable handle of claim 1, wherein each of the fastening members is a pin.

\* \* \* \* \*